(12) United States Patent
O'Brien

(10) Patent No.: US 6,996,771 B1
(45) Date of Patent: Feb. 7, 2006

(54) DYNAMIC PARAMETER MODIFICATION

(75) Inventor: Dermot Timothy O'Brien, Waikanae Beach (NZ)

(73) Assignee: International Business Machines Corporation, Armonk, NY (US)

(*) Notice: Subject to any disclaimer, the term of this patent is extended or adjusted under 35 U.S.C. 154(b) by 446 days.

(21) Appl. No.: 09/434,268

(22) Filed: Nov. 5, 1999

(51) Int. Cl.
*G06F 15/00* (2006.01)

(52) U.S. Cl. .............. 715/513; 715/517; 715/530

(58) Field of Classification Search ........... 715/513, 715/517, 530
See application file for complete search history.

(56) References Cited

U.S. PATENT DOCUMENTS 6,308,188 B1 * 10/2001 Bernardo et al. ......... 715/530
6,415,193 B1 * 7/2002 Betawar et al. ............. 700/97
6,476,828 B1 * 11/2002 Burkett et al. ............ 345/760

* cited by examiner

*Primary Examiner*—William Bashore
*Assistant Examiner*—R. Singh
(74) *Attorney, Agent, or Firm*—Anthony V S England; T. Rao Coca

(57) ABSTRACT

Methods and apparatus for the dynamic modification of parameters existing within computing systems are described. An application program runs a Graphical User Interface (GUI) having a navigator panel 152 and an edit panel 154. An XML textual file 160 is written to the application GUI 150 by Java™ code. The navigator panel 152 represents the XML file in a tree structure having groups of parameters. When a particular parameter is selected, it is caused to appear in the edit panel 154, where its attributes (textual) can be added or modified. The modified parameter is then persisted to a database 170.

20 Claims, 4 Drawing Sheets

DYNAMIC PARAMETER MODIFICATION

FIELD OF THE INVENTION

This invention relates to computing systems that are used for the provision of goods, services or information management. It relates particularly to the dynamic modification of parameters existing within such computing systems.

BACKGROUND OF THE INVENTION

In modern large computing systems a common topology has three tiers (physical and logical): (i) a presentation tier characterised by multiple workstations focusing on user interactions, (ii) a business tier characterised by multiple servers executing application/business logic, and (iii) a data tier characterised by multiple databases working on data storage and organization. A Local or Wide Area Network (LAN/WAN) interconnects the three tier elements.

Such computing systems find application in many and varied fields, ranging from university research and teaching facilities to business applications. In fact, almost every business will utilise such a system to transact its functions and serve its clients. For example, a system may be used to control inventory, for word processing and accounts purposes, and for servicing client's enquiries. Many businesses have very large client bases and may provide an extensive inventory of goods and services. One illustrative example is a telecommunications service provider (Telco) that serves a countrywide client base. The Telco's subscribers thus can number in the millions, and each customer will expect an immediate response from a Customer Service Representative (CSR) to any inquiry, which can range from billing information, a request for a new service, or the placing of orders for a product.

Similar examples are seen in Utilities, insurance companies, banks, hospitals, law firms, accountancy firms, stock exchanges, universities and Government agencies, to name but a few.

The data building blocks of the computing system—at a meta level—are termed 'parameters'. These parameters are mapped to instances of customised objects upon which the system executes the various applications that are supported. Telcos, for example, can have a very large number of parameters that are either externally configured by the customer or by a CSR. Such parameters can include tax rates, customer type, bank codes, and any other information specific to the individual customer's business. There is a need for new parameters to be added, and the structure of existing parameters to be modified, as quickly as possible.

In the prior art, system parameters are typically maintained via a discrete computer program. Every time a new parameter is introduced or the structure of an existing parameter changed, the computer program has to be rewritten in part to accommodate the modifications to the parameter set. Such rewriting requires the skills of a computer programmer and incurring cost and lost time.

It is therefore an object of the present invention to provide for ease of creation and modification of system parameters.

SUMMARY OF THE INVENTION

The invention provides a method for maintaining parameter data in a computing system, comprising the steps of:
(a) creating a text file of parameter meta data;
(b) representing said text file as a Graphical User Interface (GUI) having parameter fields, and for each parameter field, having one or more attribute sub-fields, each of said sub-fields being text editable; and
(c) storing attribute text entered in any said sub-field to a data store.

The invention further provides a method for maintaining parameter data in a computing system, comprising the steps of:
(a) creating a text file of parameter meta data using XML;
(b) representing said text file as a Graphical User Interface (GUI) having parameter fields, and for each parameter field, having one or more attribute sub-fields, each of said sub-fields being text editable by use of Java code;
(c) for a subset of said text file corresponding to a parameter, calling any existing data from said data store for said the relevant sub-fields; and
(d) storing attribute text entered or edited in the respective sub-field for the called parameter to said data store.

The invention yet further provides a client-server computing system comprising:
(a) one or more client processor machines, each having a visual display, and operating a Graphical User Interface (GUI);
(b) a server machine running an application program that utilises parameter meta data to represent data passed between said client machines and said server;
(c) a communications link between each said client and arranged such that each said client machine can communicate with said server; and
wherein said server includes a data store containing a text file of parameter meta data, and said GUI receives said text file and displays it on a said client machine as a plurality of parameter fields each said field having one or more attribute sub-fields, each said sub-field being text editable, and further wherein any attribute text entered in a said sub-field is stored in said server data store.

The invention yet further provides a method for maintaining parameter data in a computing system, comprising the steps of:
(a) creating a text file of parameter meta data;
(b) representing said text file as a Graphical User Interface (GUI) having parameter fields, each of said sub-fields being text editable; and
(c) storing attribute text entered in any said sub-field to a data store.

The invention yet further a computing device comprising:
(a) processor means running an application program that utilises parameter meta data;
(b) a visual display operating a Graphical User Interface (GUI) under the control of said processor means;
(c) data storage means, containing a text file of parameter meta data under the control of said processor means; and
wherein said GUI receives said text file from said data storage means and displays it as a plurality of parameter fields, each said field having one or more attribute sub-fields, each said sub-field being text editable, and further wherein any attribute text entered in a said sub-field is stored in said data storage means.

Examples of parameters included tax rates, customer types, bank codes, and any other information specific to a user or customer.

BRIEF DESCRIPTION OF THE DRAWINGS

Non-limiting embodiments of the invention will now be described with reference to the accompanying drawings, in which.

DETAILED DESCRIPTION OF EMBODIMENTS AND BEST MODE

Figure 1:
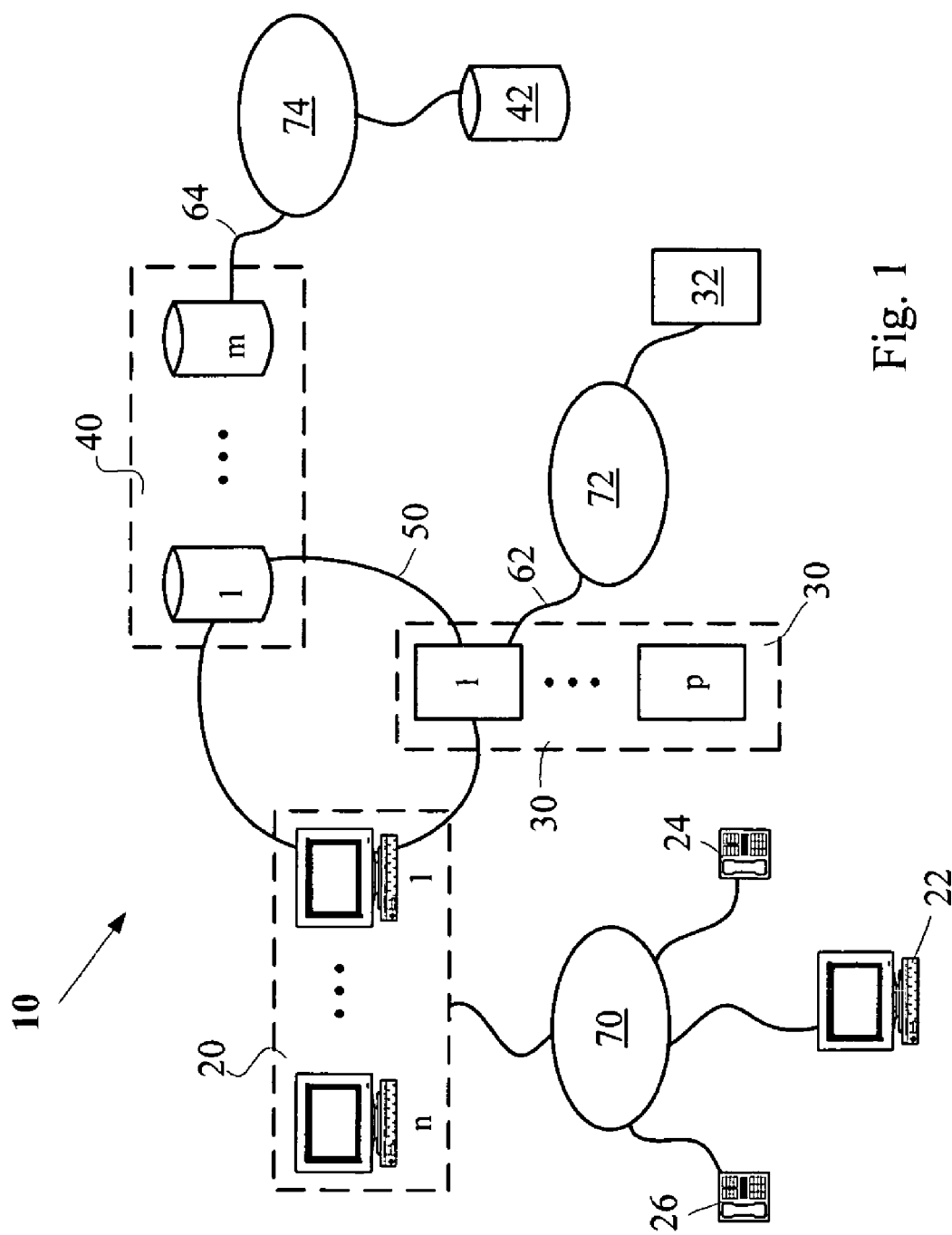
FIG. 1 is a representative topology of a three tier computing system upon which the invention may be practised.

FIG. 1 is a representative topology of a three tier computing system 10 embodying the invention. The presentation (or client/user) tier is represented by a number (1 . . . n) of workstations 20, that can be appropriate computing terminals, for example personal computers. The business tier is represented by a number (1 . . . p) of servers 30, that can be dedicated mini or mainframe computers. The data tier is represented by a number (1 . . . m) of databases 40, which can include dynamically managed magnetic or optical storage media.

The computing system 10 is of an 'open' design, providing communication links 60,62,64, via external networks 70,72,74 to like-devices 22,32,42 and remote telephone terminals 24, 26.

The workstations 20, servers 30, and databases 40 are interconnected by a Local or Wide Area Network (LAN or WAN) 50. The LAN/WAN 50 carries information passing between each of the three basic elements described. It will be appreciated that the topology shown in FIG. 1 is representative only, and that any other convenient form of network could be implemented such that the objective of information passing between the workstations 20, servers 30 and databases 40 is achieved.

Embodiments of the invention find industrial application in the fields noted in the foregoing Background section. For the purposes of a non-limiting illustration, consider the example of a Telco operating across many States of the United States. Such a Telco will typically support local, regional, interstate and international voice and data calls, as well as cellular mobile voice and data traffic. Customers of the Telco can choose from a wide range of goods and services including, for example, the installation of second phone/fax/Internet lines, call forwarding, and messaging. They also will expect to be able to make enquiries of CSRs stationed at the workstations 20 concerning billing and service faults. It is not unreasonable to expect a modern-day Telco to have at least 1 million customers, typically requiring at least 500 CSRs. A Telco system infrastructure of this size can expect to handle about 15,000 business transactions per hour. For each business transaction there may be 6 CSR machine transactions required, and each individual machine transaction can involve up to 20 database transactions (i.e. I/Os).

To give a better example of the size of computing hardware required to achieve such performance, it is considered that the CSR workstations 20 should be Pentium™ personal computers running the Windows NT™ operating system, the servers 30 can be one or more IBM UNIX™-based 12-way RS6000™ S-70 machines, and the databases would require a capacity of about 40 Gbytes, managed by an Oracle™ or IBM DB-2™ system. There would, of course, be other operational LAN/WAN servers required to handle data communications, as would be readily understood by a person skilled in the art.

In business systems such as Telcos, customers call CSRs and request goods or services in everyday language, such as a request for 'call waiting' to be activated on a domestic telephone line. Indeed, the CSR also operates at this level and is presented with information (as a GUI) on the display of the workstation relating to such goods and services. The computing system 10 then acts on customers ordered goods or services or enquiries.

It is usual also to introduce the ideas of 'Definition Time', 'Maintenance Time' and 'Order Management Time'. Definition Time relates to the definition of a new product to the point where it is available for association with a customer. Maintenance Time is where an existing Product is modified in terms of its Constituent Actions, Features and Tasks. Order Management Time is when the set of Products are alive and available to the CSRs at the workstations.

Before a specific embodiment is described, it is important to appreciate that the invention has broad application to computing systems that utilise instances of objects as data blocks, that are only statiated at run-time before being passed to between workstation, server or database.

The data exists at all other times at a meta-level as generic parameters having sets or fields of attributes. For the present invention, the parameters exist as Extensible Markup Language (XML) text.

Telco Example

The 'goods and services' supported by the system 10 are termed "Products". Products exist within both the workstations 20 and the servers 30 of the computing system 10. Products are defined during Definition Time to be available for a CSR to populate an instance in response to a customer order. The Products are essentially a 'business world' construct.

Products can be defined to suit a particular business or customer need. In that sense, an existing Product can be amended in some way, or a new Product can be added to a 'Product Book', which is a logical grouping of Products, such as those that can be sold to residential customers. In the Telco environment, Products might include:

Standard Wireline Access: The wireline connection into a home, allowing the home to have the physical product of a telephone. It is the line into the house termining in the adaptor that sits on the wall that telephones plug into.

Call Waiting: The ability to notify a customer that they have another call coming in to their phone line when they are on the phone.

Call Diversion: The ability to re-route telephone calls to another phone/mail box/pager, etc.

In the 'system world', it is the 'parameters' that represent the data building blocks that are acted upon by the computing application. Parameters are constituted by 'attributes'.

Parameters can be modified in any one of the Definition Time, Maintenance Time and Order Management Time.

Parameter Maintenance

Figure 2:
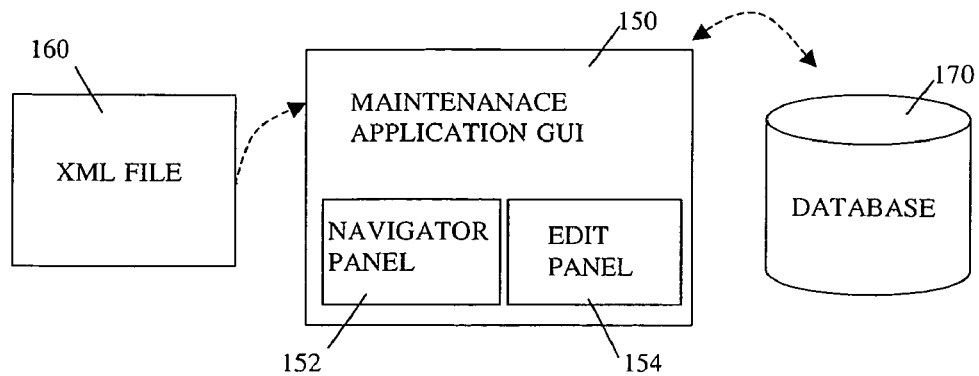
FIG. 2 shows a block diagram relating to the parameter maintenance process.

FIG. 2 shows a block diagram of the parameter maintenance application. The application Graphical User Interface (GUI) 150 (residing on a workstation 20) has two principal sub-fields: a navigator panel 152 and an edit panel 154. An XML textual file 160 is written to the application GUI 150 by Java™ code. The Java code resides on a server 30 in the sense of FIG. 1. Additionally, data is retrieved or stored from the database 170 to/from the GUI 150 in a manner that will presently be described. In the sense of FIG. 1, the database 170 would be one of the databases 40 on the WAN/LAN 50.

Figure 3:
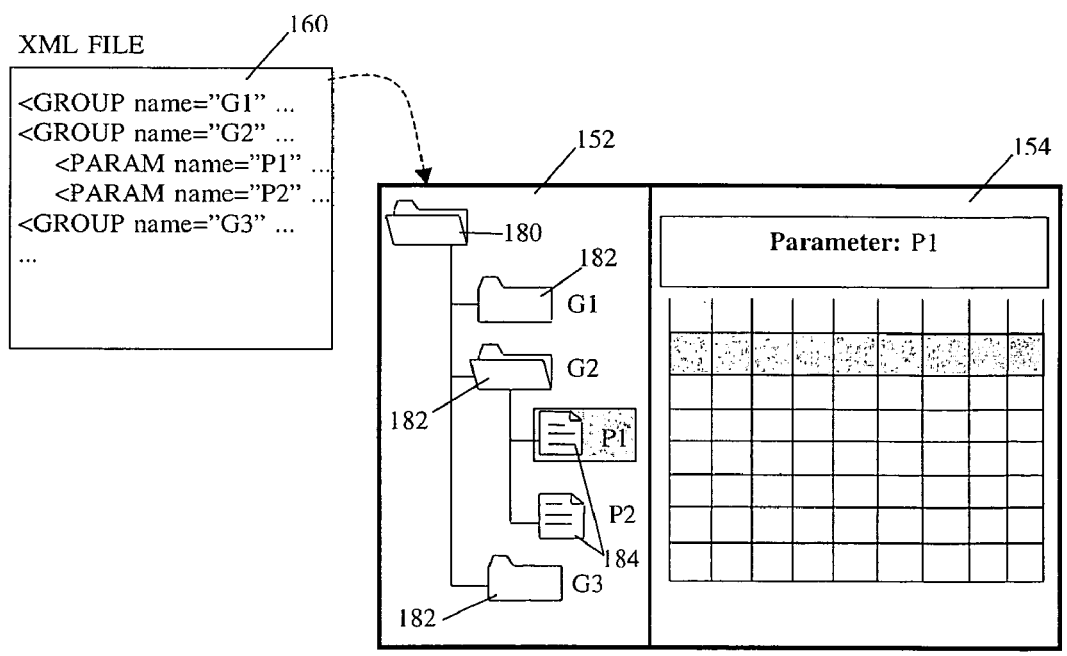
FIG. 3 shows a block diagram similar to FIG. 2.

FIG. 3 is a block diagram similar to FIG. 2. The XML file 160 contains meta data of parameters arranged as groups. The navigator panel 152 shows, for the XML file, a corresponding tree structure having groups of parameters. Within each group is a set of parameters 184, noted as P1 and P2. When a particular parameter (P1) is selected for maintenance, it was then caused to appear in the edit panel 154 where its (textual) attributes can be populated or modified. The rows in the edit panel 54 thus represent individual parameters, while the columns represent the attributes of each parameter.

tree representation in step 206. The tree representation is constructed and displayed as the GUI panels 152, 154 in step 208. The user then selects a node on the GUI tree that appears in the navigator panel 152 in step 210. In step 212, a retrieve operation is performed from the parameter database 214. The retrieved parameter records are displayed in step 216 in tabular form in the edit panel 154. Now the user is able to modify the record data, in step 218 for the displayed parameter (P1) which is then stored to the parameter database 214. In step 220 it is determined whether the maintenance procedure is finished and, if so, the maintenance application terminates in step 220, else a further node is selected in the navigator panel 152 in step 210.

An example of an XML file, omitting some repetitive 'attribute name' detail, is as follows:

```
<?xml version="1.0?" >
<!DOCTYPE collection SYSTEM "parameters.dtd">
<collection name="Collection" >
    <common name="Common" >
    <datastore name="Store"uri="serialized-parameter-file:///C:\temp\">
    <attribute-set name="Prefixed" >
        <attribute name="Activation" id="Activation"type="Data"/>
        <attribute name="SortOrder" type = "String"/ >
        </attribute-set>
        <attribute-set name="Postfixed">
        <attribute name="Deactivation" id="Deactivation" type="Data"/>
    </attribute-set >
    <attribute-set name=Audit>
    </attribute-set>
<common>
<group name="Billing">
<group>
<group name="Customer">
<parameter id="TCUSTYPE"=name="Customer Type" store-name="TCUSTYPE" >
<attribute is Key="yes" name="Type" type = "Sring" id="TYPE store-name" CTYPE" >
<attribute name="Description"type="String"id="DESCRIPTION"store-name=(DESCRIPTION"/>
    <attribute name="Discount" type="Integer"id="DISCOUNT" store-name=(DISCOUNT"/>
    <parameter>
    <parameter id="TACCDEF" name="Account Default" store-name="TACCDEF" >
        <attribute name="Customer type" type="String" id="CUSTTYPE"
            store-name="CUSTTYPE"/>
        <attribute name="Customer subtype" type="String"id="CUSTSUBTYPE"
            store-name="CUSTTYPE:/>
        <attribute name="Detailed bill option" type="String" id="DETAILEDBILLOPTION"
            store-name="CUSTSUBTYPE"/>
        <attribute name="Current charges summary"type="String" id="CURRENT CHARGESSUMM"
        store-name="CURRENT CHARGESSUMM"/>
        <attribute name="Print S&E by line" type="String" id="PRINTSUMMBYLINE"
            store-name="PRINTSUMMBYLINE"/>
        <attribute name="Refund required" type="String" id="REFUNDREQUIRED"
            store-name="REFUNDREQUIRED"/>
                            *
                            *
                            *
        <attribute name="UpdateIdentifier" type"String" id="UPDATEID"
            store-name="UPDATEID"/>
    </parameter>
    </parameter id="TADDRPART" name="Address Part" store-name="TADDRPART">
    <attribute name="Address part type code" type="String" id="ADDRPARTTYPECODE"
        store-name="ADDRPARTTYPECODE"/>
<attribute name="Address part type Description" type="String" id="ADDRPARTTYPEDESC" >
        store-name="ADDRPARTTYPEDESC"/>
        <attribute name="Update ID" type="String" id="UPDATEID"
            store-name="UPDATEID"/>
</parameter>
```

Figure 4:
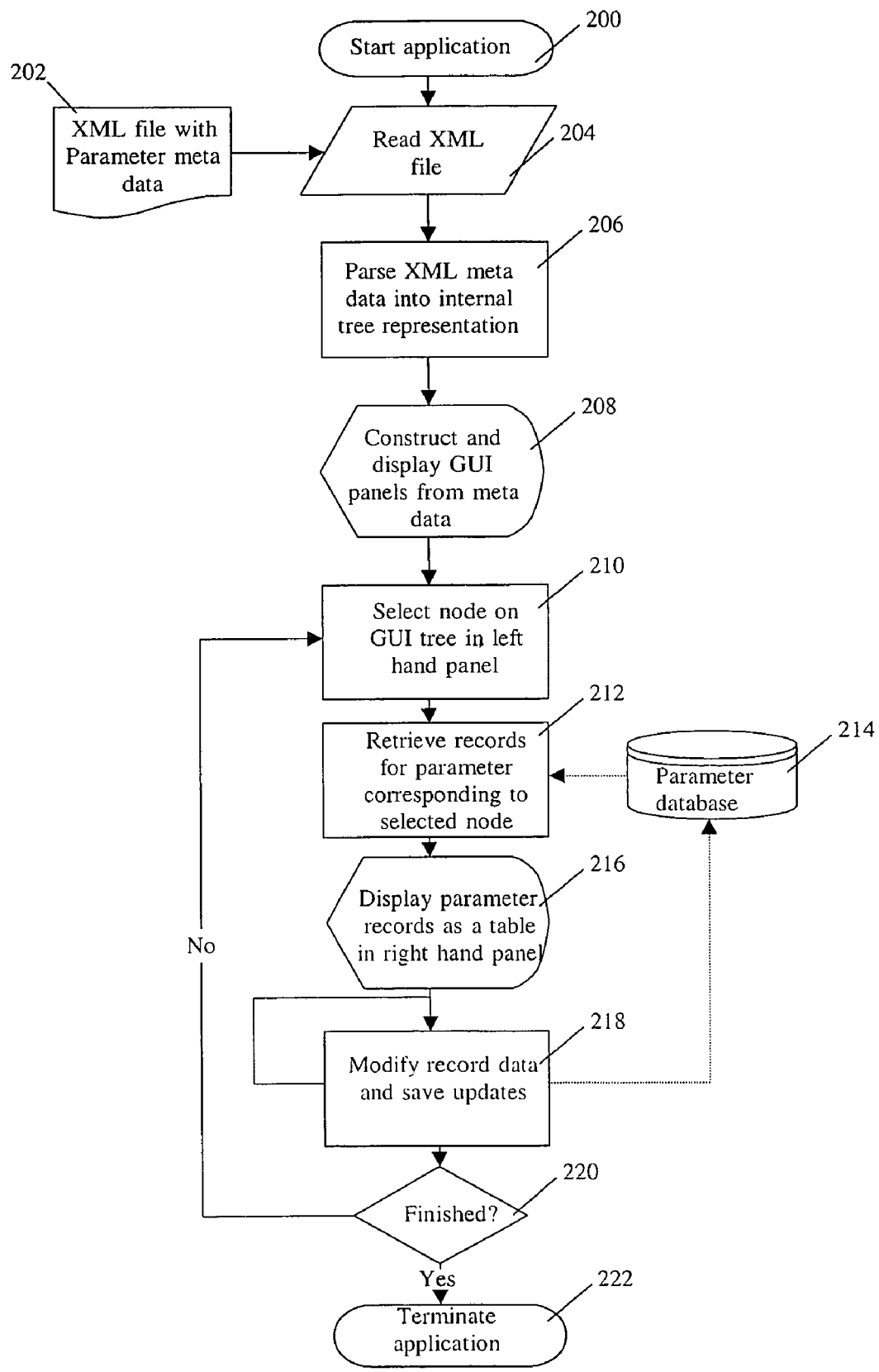
FIG. 4 shows a flow diagram illustrating the parameter maintenance process.

The maintenance process will now be described further with reference to FIG. 4, which is a flow diagram.

Figure 5:
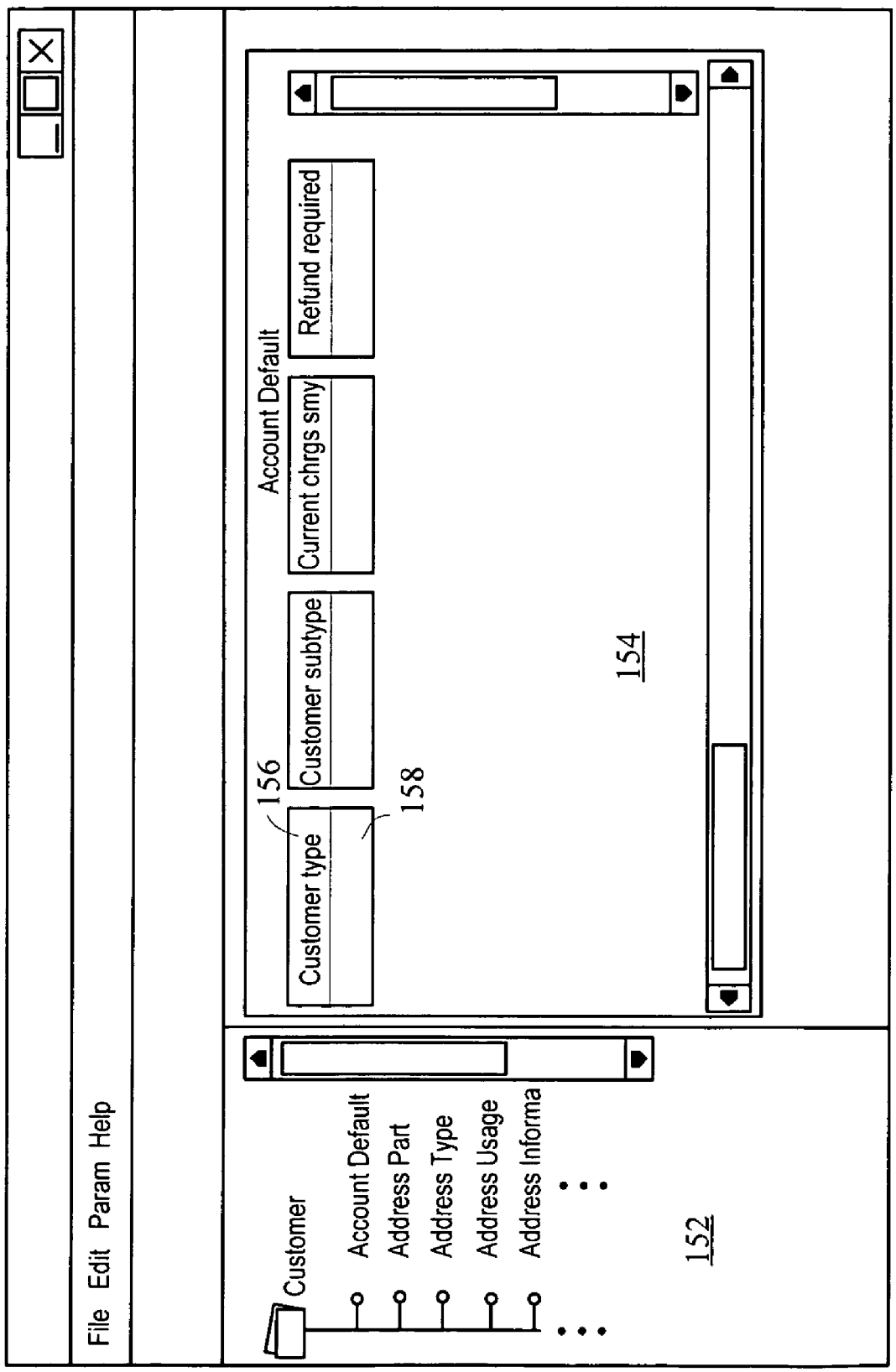
FIG. 5 shows a GUI representation of the parameter maintenance process.

In step 200 the maintenance application commences. The XML file with the parameter meta data of step 202 is read in step 204. The XML meta data is parsed into an internal FIG. 5 is a more detailed GUI representation showing the navigator panel 152 and the edit panel 154 for the XML file noted above. The edit panel is made up of two sub-fields: the upper panel 156 representing a line summary of the attributes pertaining to each parameter, and the lower field

158 providing for imput fields for a user. In the example shown, the parameter is Account default and a portion of the parameters are shown in the navigator panel 152. Specifically, the attributes are: customer type, customer sub-type, detailed bill option, current charges summary, and refund required. All of these attributes can be noted in the preceding listing.

Parameter data is stored in a table, which may be a table within a traditional database or may be in a binary file stored in the file system (i.e. databases 40).

The structure of the parameter is represented in XML. Each parameter is identified by elements surrounded by "parameter" tags. A "tag" is a word that has meaning as a delimiter in XML. Within the attribute definition, the parameter key (or code) attribute is identified by the signature "isKey=yes" appearing in the attribute definition.

The storage table may be a table stored in a database or may be in a binary file stored in the file system. Either way, a parameter has a number of parameter instances each represented a row in a table data structure and each uniquely identified by a key attribute. The columns in the table correspond to individual parameter attributes.

An example would be a "Customer Type" parameter which may have an attribute named "Type" representing the parameter code and a number of other attributes including a "Description" attribute. Each record in the parameter storage table will have a different value for the code attribute. The following is a schematic representation of the storage table for a simple "Customer Type" parameter:

| Type  | Description   | Discount |
|-------|---------------|----------|
| "RES" | "Residential" | 5        |
| "BUS" | "Business"    | 10       |

Any attribute of a parameter can be modified as a screen-based edit function. Such a modification is then stored in a data store by the use of a URI included in the XML file. The URI is structured so as to specify the database protocol before the first colon, and thereafter protocol specific location parameters are specified. In the present example, the application can determine that the datastore is a serialized file located within the file system within directory "C:\temp". An individual parameter table can be located by appending the parameter identifier to the datastore URI.

The intention can be utilised to edit/amend an existing attribute or the populate vacant attribute sub-fields. In a similar way, the invention can add or modify parameters by simple amendment of the relevant XML file.

ANOTHER EMBODIMENT

The invention also can be utilized on a stand-alone computing device, such as a Personal Computer (PC). The PC may be running a database application program within which there are multiple parameters that are required to be modifyable. The invention functions in an identical manner to that described above, except that the database storage device (e.g. the database 170 shown in FIG. 2) resides locally with the stand-alone PC.

ADVANTAGES OF THE INVENTION

The invention has advantages over the prior art by eliminating the need to create or modify application code with the introduction or modification of parameter types. Instead, an XML file can be edited and reloaded while the relevant system application is still running, and the maintenance GUI dynamically re-generated to accommodate modifications and allow new parameter values to be entered.

Dynamic calls are made by the maintenance application to create the required database tables or binary files, instead of requiring a skilled resource (e.g. computer programer or system operator) to do this manually.

The UI is dynamically generated and new values can be entered against the new or modified parameters without requiring a restart of the maintenance application and without the need for a skilled developer to build and test the UI.

It is to be understood that the invention is not limited only to the embodiments described, but that numerous alterations and modifications, will be apparent to one skilled in the art, are included within its scope.

What is claimed is:

1. A method for maintaining parameter data in a computing system, comprising the steps of:
    (a) creating a text file of meta data for parameters;
    (b) representing said text file as a Graphical User Interface (GUI) having a navigator panel and an edit panel, wherein the navigator panel shows, for the text file, a structure for the parameters;
    (b1) showing in the edit panel, responsive to a user selecting one of the parameters in the navigator panel: the one of the parameters in a parameter field, and one or more attribute sub-fields for the selected one of the parameters, each of said sub-fields being text editable;
    and
    (c) storing attribute text entered in any said sub-field to a data store.

2. The method of claim 1, whereby, in step (a), creation of said text file is performed using the Extensible Markup Language (XML).

3. The method of claim 2, whereby said XML text file includes as URI that specifies a database protocol and location, and said URI is utilized in step (c).

4. The method of clam 2, comprising the further step, wherein step (b) comprises:
    calling any existing attribute data from said data store for said sub-fields to be displayed by said GUI.

5. The method of claim 4, whereby step (b) is performed by use of Java code.

6. The method of claim 1, comprising the further step, after step (b) said GUI, calling a subset of said text file, corresponding to a parameter to be displayed.

7. A client-server computing system comprising:
    (a) one or more client processor machines, each having a visual display, and operating a Graphical User Interface (GUI);
    (b) a server machine running an application program that utilises parameter meta data to represent data passed between said client machines and said server;
    (c) a communications link between each said client and arranged such that each said client machine can communicate with said server; and
    wherein said server includes a data store containing a text file of parameter meta data, and said GUI receives said text file and displays on said client machine a navigator panel and an edit panel, wherein the navigator panel shows, for the text file, a structure for the parameters and the edit panel shows, responsive to a user selecting one of the parameters in the navigator panel, the one of the parameters in a parameter field and one or more attribute sub-fields for the selected one of the parameters, each said sub-field being text editable, and further wherein any attribute text entered in a said sub-field is stored in said server data store.

8. The system of claim 7, wherein said GUI also displays any existing attribute data retrieved from said data store.

9. The system of claim 8, wherein said text file is created using XML.

10. The system of claim 9, wherein said GUI utilises Java code to display said XML file.

11. A computing device comprising:
  (a) processor means running an application program that utilises parameter meta data;
  (b) a visual display operating a Graphical User Interface (GUI) under control of said processor means;
  (c) data storage means, containing a text file of parameter meta data under the control of said processor means; and
  wherein said GUI receives said text file from said data storage means and displays on the visual display a navigator panel and an edit panel, wherein the navigator panel shows, for the text file, a structure for the parameters and the edit panel shows, responsive to a user selecting one of the parameters in the navigator panel, the one of the parameters in a parameter field and one or more attribute sub-fields for the selected one of the parameters, each said sub-field being text editable, and further wherein any attribute text entered in a said sub-field is stored in said data storage means.

12. The computing device of claim 11, wherein said GUI also displays any existing attribute data retrieved from said data store.

13. The computing device of claim 12, wherein said text file is created using XML.

14. The computing device of claim 13, wherein said GUI utilises Java code to display said XML file.

15. A computer program product comprising a body of computer code embodied in a computer medium for maintaining parameter data in a computing system, the computer code comprises:

(a) instructions for receiving a text file of meta data for parameters;

(b) instructions for representing said text file as a Graphical User Interface (GUI) having a navigator panel and an edit panel, wherein the navigator panel shows, for the text file, a structure for the parameters;

(b1) instructions for showing in the edit panel, responsive to a user selecting one of the parameters in the navigator panel:
  the one of the parameters in a parameter field, and
  one or more attribute sub-fields for the selected one of the parameters, each of said sub-fields being text editable;

and (c) storing attribute text entered in any said sub-field to a data store.

16. The computer program product of claim 15, whereby, in instructions (a), creation of said text file is performed using the Extensible Markup Language (XML).

17. The computer program product of claim 16, whereby said XML text file includes as URI that specifies a database protocol and location, and said URI is utilized in step (c).

18. The computer program product of clam 16, wherein instructions (b1) comprise:
  instructions for calling any existing attribute data from said data store for said sub-fields to be displayed by said GUI.

19. The computer program product of claim 18, wherein instructions (b) and (b1) are performed by use of Java code.

20. The computer program product of claim 15, wherein instructions (b1) comprise:
  calling a subset of said text file, corresponding to a parameter to be displayed.

* * * * *